(12) United States Patent
Willis

(10) Patent No.: US 7,716,845 B1
(45) Date of Patent: May 18, 2010

(54) UNIVERSAL HEADSPACE GAUGE

(76) Inventor: Larry Albert Willis, 1480 Guinevere Dr., Casselberry, FL (US) 32707

(*) Notice: Subject to any disclaimer, the term of this patent is extended or adjusted under 35 U.S.C. 154(b) by 1 day.

(21) Appl. No.: 12/292,237

(22) Filed: Nov. 14, 2008

(51) Int. Cl.
*G01B 5/00* (2006.01)
*G01B 21/00* (2006.01)

(52) U.S. Cl. ...................................................... 33/506
(58) Field of Classification Search ............... 33/506, 33/832, 833
See application file for complete search history.

(56) References Cited

U.S. PATENT DOCUMENTS

| | | | | |
|---|---|---|---|---|
| 2,356,236 A | * | 8/1944 | Gagne, Jr. ................ | 209/548 |
| 2,387,645 A | * | 10/1945 | Cook ...................... | 33/506 |
| 2,553,704 A | * | 5/1951 | Eckel ...................... | 33/506 |
| 2,585,521 A | * | 2/1952 | Wandrus .................. | 33/506 |
| 4,498,241 A | * | 2/1985 | Nakaoki .................. | 33/832 |
| 4,918,825 A | * | 4/1990 | Lesh et al. ............... | 33/506 |
| 5,170,569 A | * | 12/1992 | Anderson ................ | 33/506 |
| 5,570,513 A | * | 11/1996 | Peterson .................. | 33/506 |
| 6,415,526 B1 | * | 7/2002 | Buckner et al. .......... | 33/833 |
| 6,446,348 B1 | * | 9/2002 | Brian ...................... | 33/532 |
| 6,718,645 B2 | * | 4/2004 | Berger .................... | 33/506 |
| 7,263,786 B1 | * | 9/2007 | Zanier .................... | 33/832 |

* cited by examiner

*Primary Examiner*—Christopher W Fulton

(57) ABSTRACT

This apparatus is designed to accurately measure or compare loaded or unloaded ammunition cartridges of all shapes and sizes. It measures between the base of a cartridge and any of its flat or tapered surfaces above. This apparatus is comprised of an adjustable v-block that is secured to the stem of a digital or mechanical indicator that is mounted on a vertical shaft above a flat pedestal. As the v-block and stem are raised, a cartridge case is then positioned between the v-block and the pedestal of this apparatus. The cartridge can then be engaged by lowering the v-block to contact any upper location on a cartridge. After this v-block rests on any upper location of a cartridge, the indicator is then reset to zero. The indicator is then prepared to measure or compare the difference of each cartridge in relation to its base. The measurement from the cartridge shoulder to its base is known as headspace. The measurements taken from the bullet back toward the base will reveal variations in bullet seating depth. No other tools or special bushings are required to operate this apparatus.

6 Claims, 3 Drawing Sheets

Figure 4    ( Prior Art )

UNIVERSAL HEADSPACE GAUGE

BACKGROUND OF INVENTION

1. Field of the Invention

This invention relates in general to an apparatus that provides an accurate method of measuring the length of ammunition cartridges between their flat base and upper portions of the cartridge. This includes the tapered case shoulder, the mouth of the case, the ogive of the bullet, or to the tip of the bullet. It is also suitable for comparing the dimensions of different cartridges.

2. Discussion of the Related Art

Many hunters and long range shooters reload their ammunition cartridges to gain accuracy while saving money on ammunition, compared to buying factory loaded ammunition. In the reloading process, cartridges need to be resized and assembled to specific dimensions. Reloaded ammunition needs to be measured accurately to ensure that proper dimensions are maintained. One long existing problem is in taking measurements between the flat base of a cartridge case and its upper surfaces. One of the most important case measurements is the from base to the shoulder. This is known as headspace. The benefit of taking accurate headspace measurements will result in reloaded ammunition being more reliable, more accurate and it will also extend the lifespan of fired cases.

SUMMARY OF INVENTION

This device is an adjustable v-block that is attached to a digital indicator. It is able to take several different measurements on any type of ammunition cartridge without using bushings or special tools. It provides the most accurate method to get repeatable measurements, by using the uniform downward spring pressure provided by the digital indicator. Several different cartridge comparisons and measurements can be made with this device that are needed to reload quality ammunition.

DESCRIPTION OF THE DRAWINGS

FIG. 4 is a shadow view of a cartridge.

DETAILED DESCRIPTION OF THE PREFERRED EMBODIMENTS

Figure 1:
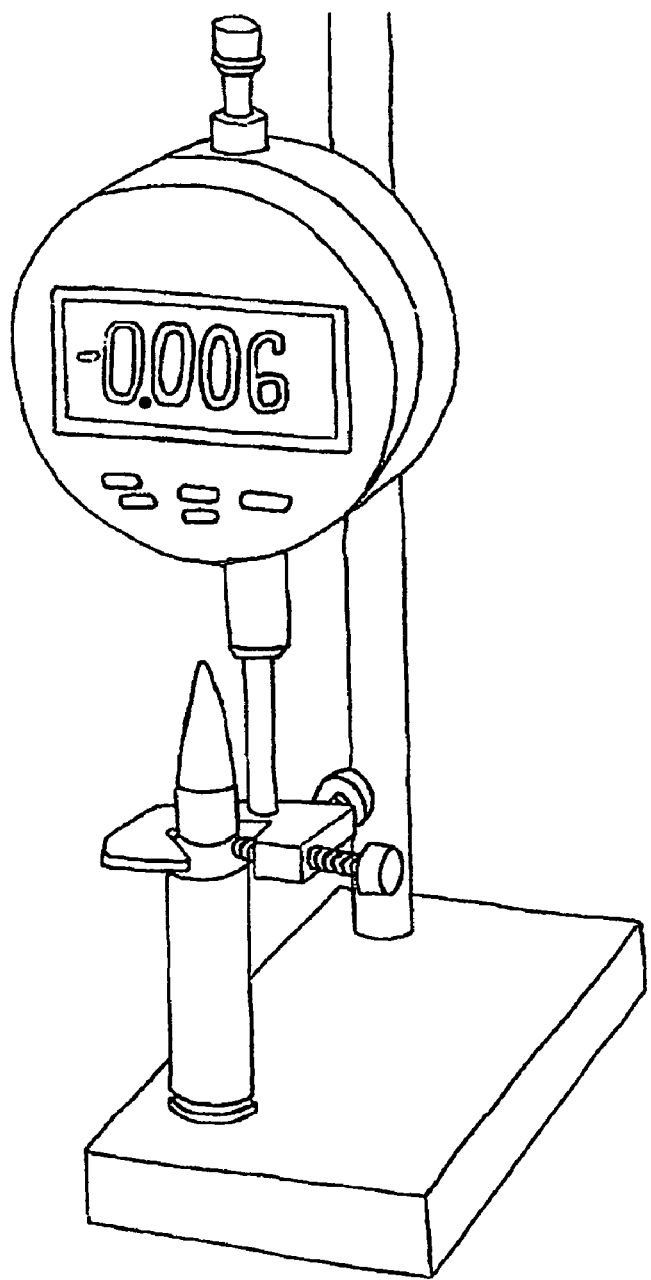
FIG. 1 is a view of the entire Headspace Gauge.
Figure 2:
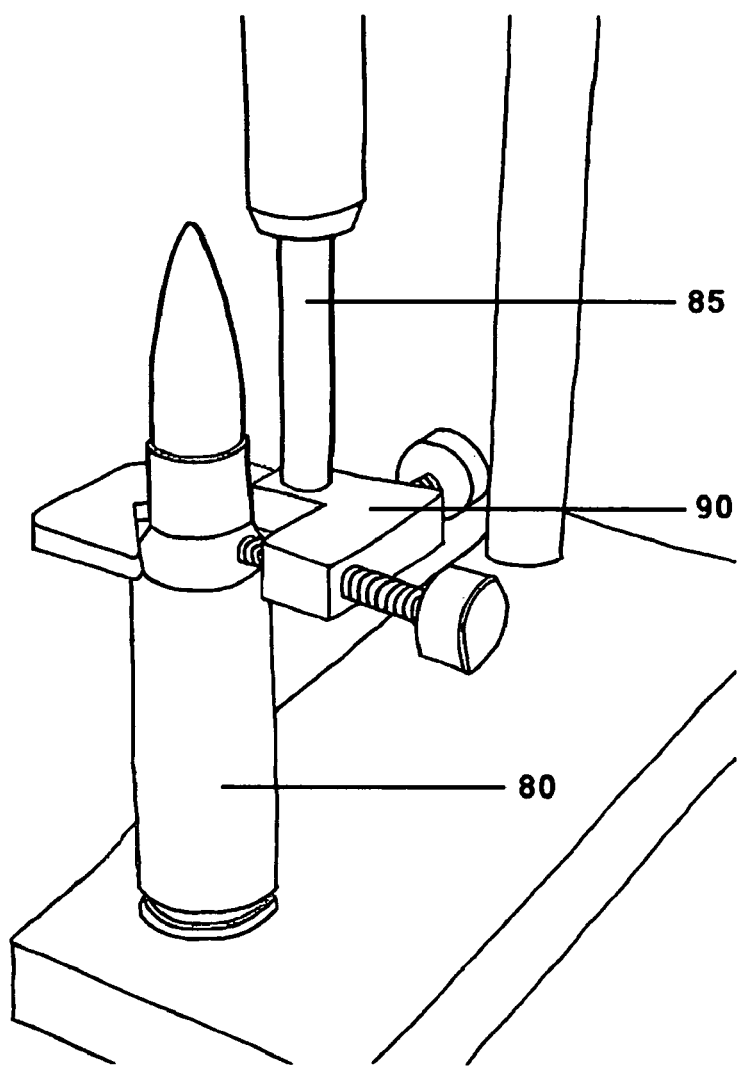
FIG. 2 is a view of the adjustable V-Block in operating position.

Referring now to the drawings, which are for the purpose of illustrating the preferred embodiment of the invention and not for the purpose of limiting the same, the drawing FIG. 1 shows a view of the complete Universal Headspace Gauge. FIG. 2 shows an enlarged view of the adjustable v-block 90 positioned around a loaded ammunition cartridge 80. The shadow view of FIG. 4 is shown for clarification in describing the purpose and function of the adjustable v-block FIG. 3. The headspace gauge FIG. 1 is vertically raised or lowered to measure different lengths of any cartridge FIG. 4. The v-block FIG. 3 provides an adjustable 3 contact, V shaped surface 70 that provides an upper reference point for measuring from the tapered sides of cylindrical surfaces such as in FIG. 4 from the case shoulder 5 or the bullet ogive 30 down to the cartridge base 6.

Figure 3:
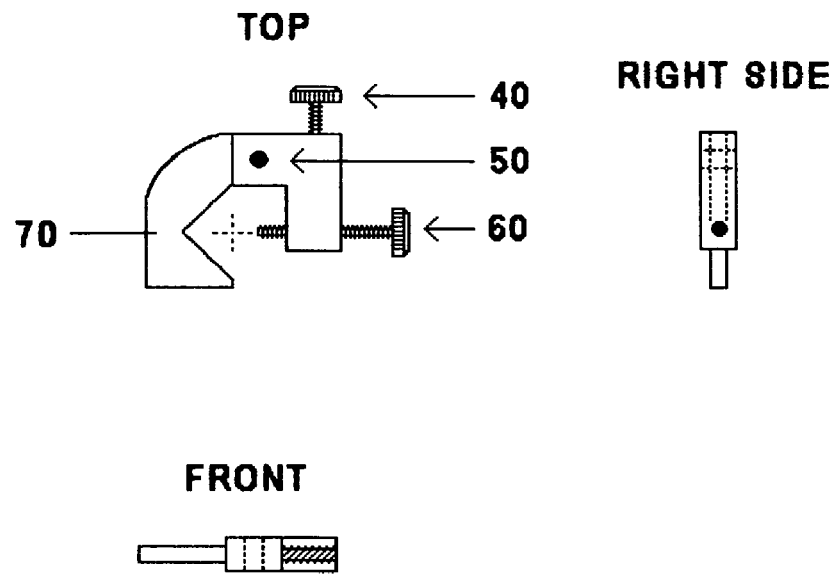
FIG. 3 is a multi-sided view of the adjustable V-Block.
Figure 3:
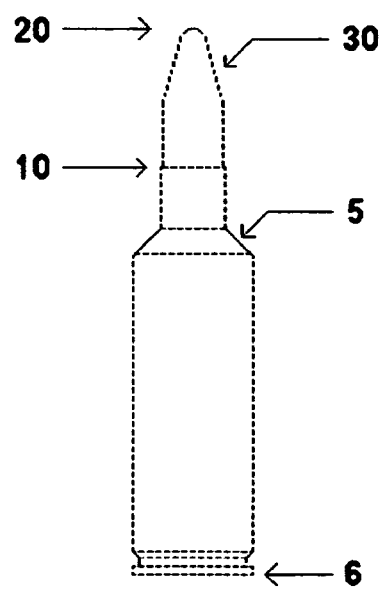

The adjustable v-block FIG. 3 is a flat element that is attached to the stem 85 in FIG. 2 of a conventional depth indicator (digital type or mechanical dial) by a single screw that is inserted through hole 50 in FIG. 3. The v-block FIG. 3 can also be installed upside down to make the headspace gauge FIG. 1 more accessible for left hand operators. The v-block FIG. 3 is mounted horizontally having a V-shaped interior surface 70 that directly faces the tip of an adjustable screw 60 which is mounted on the opposing side of the v-block FIG. 3. The adjusting screw 60 establishes a particular size of the expandable triangular opening that adjusts to provide a symmetrical outside diameter. The combined contact surfaces of the adjusting screw 60 and the v-shaped interior surface 70 establish a common upper reference point for measuring from the bullet ogive 30 or the cartridge shoulder 5 downward to the cartridge base 6. The adjustable screw 60 is then set in the optimal position to perform measurements, and it is then secured in place with lock screw 40. Lower surfaces of the v-block FIG. 3 are flat, and they provide another upper reference point for measuring from flat surfaces such as in FIG. 4 the case mouth 10 or to the bullet tip 20 down to the cartridge base 6.

What is claimed is:

1. An apparatus for the accurate measurement or comparison of loaded or unloaded ammunition cartridges, comprising:

A substantially flat element capable of attaching to the stem of a mounted digital or mechanical indicator suitable for measuring and connected together by threaded means thereby providing a receiving element with an adjustable outside diameter that is adaptable to receive the upper flat or tapered radial locations of a variety of different size ammunition cartridges thereby establishing an upper reference point for measuring downward toward the lower portion of said ammunition cartridge while resting on its pedestal base that supports said digital or mechanical indicator and resulting in obtaining a variety of vertical measurements of said ammunition cartridge.

2. The apparatus of claim 1 is attached to said stem of said digital or mechanical indicator provides uniform downward pressure on the said flat element resulting in more consistently accurate measurements.

3. The apparatus of claim 1 is attached to said digital or mechanical indicator provides said receiving element that can operate without requiring any extra tools or bushings.

4. The apparatus of claim 1 having a horizontal plate with v shaped inner surface facing an adjusting screw provides a continuous symmetrical and variable outside diameter able to receive different size and types of said ammunition cartridges so that measurements can be taken from different upper reference points without the use of bushings or extra tools.

5. The apparatus of claim 1 is attached to said stem of the said digital or mechanical indicator allowing it to be attached upside down if necessary thereby orienting the adjustable screw to be positioned on either side providing easy operation for right or left hand operation.

6. A method of measuring or comparing loaded or unloaded ammunition cartridges comprising:

providing a flat element with an adjustable size inside diameter, attaching said flat element to the stem of a mounted digital or mechanical indicator suitable for measuring, receiving ammunition cartridges placed centered within said inside diameter of the flat element to provide an upper reference point for measuring downward to the base of said cartridge case while the cartridge is resting on the pedestal base that supports said digital or mechanical indicator resulting in said digital or mechanical indicator displaying vertical measurements or comparisons at different locations of said cartridges.

* * * * *